United States Patent [19]

Black

[11] 4,084,288
[45] Apr. 18, 1978

[54] SHOCK ABSORBER FOR SWIVEL CASTER

[75] Inventor: John W. Black, Hickory Corners, Mich.

[73] Assignee: Pemco-Kalamazoo, Inc., Kalamazoo, Mich.

[21] Appl. No.: 758,775

[22] Filed: Jan. 12, 1977

[51] Int. Cl.² .......................................... B60B 33/00
[52] U.S. Cl. ............................................... 16/21
[58] Field of Search ............................... 16/20–30, 16/18 R, 31 R, 40, 44

[56] References Cited

U.S. PATENT DOCUMENTS

| 2,812,532 | 11/1957 | Geiger | 16/18 R |
| 3,142,085 | 7/1964 | Black | 16/21 |
| 3,213,483 | 10/1965 | Hayes et al. | 16/21 |

Primary Examiner—Dorsey Newton
Attorney, Agent, or Firm—Blanchard, Flynn, Thiel, Boutell & Tanis

[57] ABSTRACT

A device for use with a bearing construction for a swivel caster mountable on a caster mounting plate and including a yoke having a swivel plate pivotal about a pivot axis. A securing device is provided for securing the yoke to the caster mounting plate. The bearing construction is composed of a ball bearing retaining structure which normally abuts against the underside of the caster mounting plate. An elastomeric member is mounted between the bearing construction and the caster mounting plate. The elastomeric member has a compressible characteristic sufficient to maintain the caster firmly connected to the mounting plate while simultaneously being capable of yielding to a sufficiently large force applied to the yoke to permit a relative movement between the mounting plate and the yoke to thereby prevent permanent deformation to the yoke when an abnormally high force is applied thereto. The securing device includes structure for limiting the initial compression of the elastomeric member between the bearing construction and the mounting plate.

10 Claims, 4 Drawing Figures

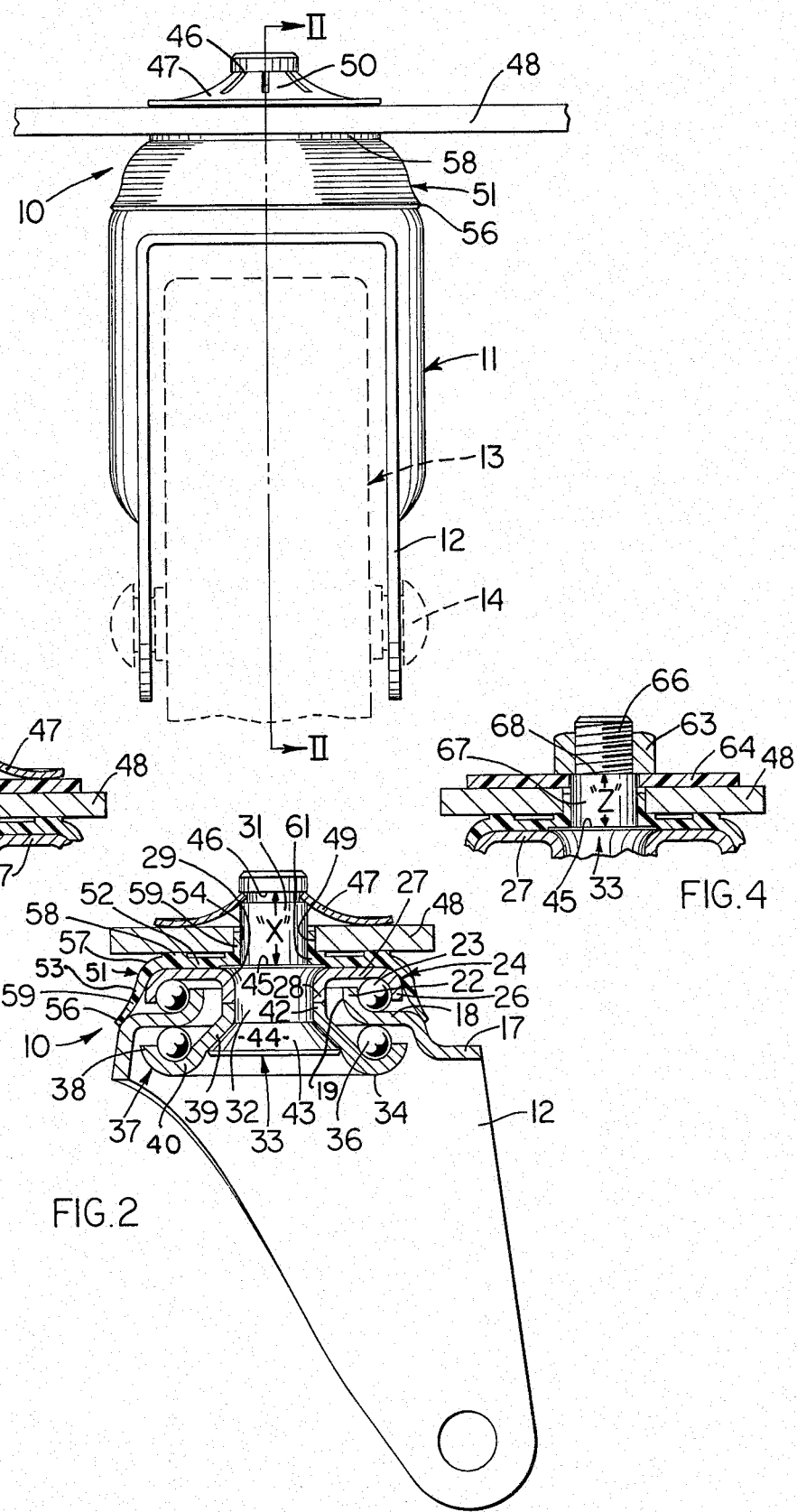

SHOCK ABSORBER FOR SWIVEL CASTER

CROSS REFERENCE TO RELATED SUBJECTS

This application is related to U.S. Pat. No. 3,142,085 and to another copending application filed concurrently herewith and entitled "SHIMMY ELIMINATOR AND BEARING SEAL" Ser. No. 758,673 filed Jan. 12. 1977.

FIELD OF THE INVENTION

This invention relates to a device for absorbing the shock which sometimes is applied to casters and, in particular, swivel casters to prevent the direct application of the shock force to the bearing construction. This invention also relates to the combination of a shock absorbing construction and a device for eliminating the rapid back-and-forth motion, sometimes referred to as "flutter" or "shimmy", of a caster wheel, as same travels in a given direction, and for simultaneously effecting a sealing of the bearings within the bearing construction from outside contaminants.

BACKGROUND OF THE INVENTION

It has long been the desire of manufacturers of casters to develop a bearing construction which would be durable and would not fail for a long period of time to thereby enhance the safety of the device on which the casters are mounted. One of the causes for failure of a caster construction is the failure of the bearings pivotally supporting the yoke to the caster mounting plate. Repeated abnormally high shock forces applied to the yoke by the wheel engaging a curb or other like abutment tend to bend the yoke and after prolonged and repeated abuse to the bearings, the bearings will fail rendering the caster totally useless and unsafe. Accordingly, it is desirable to provide a device which will absorb the shocks applied to the bearings of the caster construction and to, therefore, enhance the life of the bearing construction utilized therewith.

As is explained in detail in the copending application Ser. No. 758,673, "flutter" or "shimmy" have been problems which have yet to be solved. Accordingly, it is desirable to provide a device which will not only absorb shock but will simultaneously reduce the "flutter" or "shimmy" phenomena and simultaneously effect a sealing of the bearing construction from outside contaminants.

Accordingly, it is an object of this invention to provide a device for use with a bearing construction for a caster which effectively absorbs shock applied to the yoke construction of the caster and to the swivel bearing construction.

It is a further object of this invention to provide a device, as aforesaid, which is usable with a swivel caster and which not only effectively absorbs shock applied to the yoke of the caster but also effectively eliminates the phenomena of "flutter" or "shimmy".

It is a further object of this invention to provide a device, as aforesaid, which is inexpensive in construction and can be added to existing swivel casters in the field at a minimum of expense.

It is a further object of this invention to provide a device, as aforesaid, which is easy and simple to install with a minimum of instruction and time.

SUMMARY OF THE INVENTION

In general, the objects and purposes of the invention are met by providing a device for use with a bearing construction for a caster which has a yoke and yoke plate means thereon with securing means being provided for securing the yoke to the caster mounting plate. An elastomeric member is mounted between the bearing construction and the caster mounting plate and has a compressible characteristic sufficient to maintain the caster firmly connected to the mounting plate while simultaneously being capable of yielding to a sufficiently large force applied to the yoke to permit a relative movement between the mounting plate and the yoke to thereby prevent permanent deformation to the yoke when an abnormally high force is applied thereto. The securing means includes means for limiting the initial compression of the elastomeric member between the bearing construction and the mounting plate.

BRIEF DESCRIPTION OF THE DRAWING

Further objects and purposes of this invention will be apparent to persons acquainted with apparatus of this general type upon reading the following specification and inspecting the accompanying drawing, in which:

FIG. 1 is a front elevational view of a caster embodying the invention;

FIG. 2 is a sectional view taken along the line II—II of FIG. 1;

FIG. 3 is a fragmentary sectional view similar to the upper portion of FIG. 2 but with an elastomeric washer inserted between the spring washer and the mounting plate; and FIG. 4 is a fragmentary sectional view similar to FIG. 3 but of an alternate construction.

Certain terminology will be used in the following description for convenience in reference only and will not be limiting. The words "up" and "down" will designate directions in the drawings to which reference is made. The words "in" and "out" will refer to directions toward and away from, respectively, the geometric center of the device and designated parts thereof. Such terminology will include the words above specifically mentioned, derivatives thereof and words of similar import.

DETAILED DESCRIPTION

The swivel mechanism 10 (FIG. 1), which has been selected to illustrate a preferred embodiment, is disclosed herein as part of a swivel caster 11 having a yoke or horn 12 upon which a caster wheel 13 is rotatably supported in a substantially conventional manner by means of a shaft 14. The yoke 12 has a swivel plate 17 with a circular, substantially flat portion 18 having a central opening 19 therethrough. The inner edge 22 of the central portion 18 defining the circular opening 19 is drawn upwardly to form an integral annular flange, the outer surface of which defines the inner face for the bearing balls 23 of the upper bearing 24.

The bearing balls 23 project upwardly above the flange 22 (FIG. 2) where they are engaged by the lower surface of the ball retainer 27 adjacent the downwardly extending, annular flange 26 on the outer edge of the retainer 27. The ball retainer 27 has an integral, downwardly extending flange 28 concentric with the outer flange 26 and substantially smaller in diameter than the diameter of the flange 22. The inner flange 28 is formed so that it defines an upwardly diverging, substantially conical opening 29 having a minimum diameter which is approximately the same as the outside diameter of the shank 32 of the king pin or spindle 33.

The swivel mechanism 10 (FIG. 2) includes a lower ball retainer 34 which supports the bearing balls 36 of the lower bearing 37 firmly against the lower surface of the central portion 18 on the swivel plate 17. The lower retainer 34 has an upwardly extending, integral flange 38 adjacent its outer edge which is an outer race for the balls 36. The retainer 34 also has an upwardly extending, inner flange 40 which is sufficiently close to the outer flange 38 to act as an inner race. The lower portion 39 of the flange 40 converges upwardly to define a downwardly facing, conical surface which extends upwardly approximately to the plane defined by the lower surface of the central portion 18, where the conical surface has an inside diameter approximately equal to the diameter of the shank 32 on the king pin 33. The flange 40 has a cylindrical portion 42 integral with and extending upwardly from the upper edge of the conical portion 39. The cylindrical portion 42 snugly embraces the shank 32 of the king pin 33 and the upper edge of the portion 42 engages the lower edge of the inner flange 28 approximately at the level of the upper edge of the flange 22 on the swivel plate 17.

The outer flanges 26 and 38 on the retaining rings 27 and 34, respectively, are preferably coaxial and of approximately the same diameter. The inner flange 28 of the retainer 27 and the cylindrical portion 42 of the retainer 34 have substantially equal inside diameters and they are coaxial. The inner flanges 28 and 42 are tightly held against each other when they are assembled with the bearing balls 23 and 36 on opposite sides of the swivel plate 17.

The king pin 33 (FIG. 2) has at least or near its lower end an annular external flange 43 having a conical radial surface 44 with substantially the same downward divergence as the divergence of the inner surface of the conical portion 39 of the retainer 34. Thus, the conical radial surface 44 of the lower flange 43 is received into and snugly engages the conical portion 39 when the shank 32 extends through the cylindrical portion 42.

A portion 31 of the shank 32 of the kin pin 33 extends a short distance above the upper surface of the upper ball retainer 27. The shank portion 31 is of a substantially reduced diameter than the shank portion 32 to form a shoulder 45. As shown in FIG. 2, the shank portion 31 has an annular groove 46 spaced above the shoulder 45. The uppermost edge surface of the annular groove 46 is spaced above the shoulder 45 a distance "X" wherein this distance is greater than the thickness of a mounting plate 48 having a hole 49 therethrough and which receives the shank portion 31 of the king pin 33. The upper portion of the king pin is exposed on the upper side of the mounting plate 48 to facilitate the placement of a spring washer which has an opening through the center thereof on the exposed upper portion. The spring washer is circular in configuration and has a plurality of separate toothlike projections 50 projecting upwardly and inwardly toward the center of the hole. A cross-section through the center of the spring washer 47 indicates that the spring washer is somewhat frusto-conical in shape with the free ends of the toothlike projections 50 being received in the annular groove 46 and the radially outermost portion thereof being engaged on the upper surface of the mounting plate 48. The diameter of the shank portion 31 of the king pin 33 extending through the hole 49 in the mounting plate 48 is substantially less in diameter than the diameter of the hole 49.

The upper bearing 24 and the lower bearing 37 discussed above are conventional and are discussed in greater detail in the aforementioned U.S. Pat. No. 3,142,085. In addition to the type of securement of the king pin 33 to the mounting plate 48, my invention resides in the provision of a cup-shaped member 51 which snugly embraces the upper ball retainer 27 prior to insertion of the uppermost end portion 31 of the shank of the king pin 33 through the opening 49 in the mounting plate 48. The cup-shaped member 51 is made of an elastomeric material, such as polyurethane having a Durometer hardness in the range of 75 Shore A to 55 Shore D Durometer. The preferred hardness is 80 Shore A Durometer. The cup-shaped member 51 is composed of an upper wall 52 and a tapered sidewall 53. In this particular embodiment, the cross-sectional thickness of the cup-shaped member becomes thinner adjacent the annular lip 56 at the free end of the tapered wall 53. An opening 54 is provided in the upper wall 52 to facilitate the reception of the king pin 33 therethrough. The connection of the upper wall 52 to the tapered wall 53 is through a rounded corner 57 which has a radius approximately identical to the radius of the outer peripheral edge of the upper ball retainer 27 to facilitate a snug connection therewith. An annular bead 58 is formed on the upper wall 52 and is positioned closely adjacent the rounded corner 57, namely at a location spaced from the opening 54. The annular bead 58 projects upwardly from the upper wall. An upstanding, cylindrical wall forming a centrally located sleeve 59 is provided on the cup-shaped member 51 and has the opening 54 extending therethrough. The thickness of the material of the sleeve 59 is adapted to snugly fit into the spacing between the outer periphery of the shank portion 31 extending through the hole 49 and the diameter of the hole 49. The junction between the upper wall 52 and the sleeve 59 is thicker as at 61 than the thickness of the sleeve 51 so that the lower edge of the hole 49 in the mounting plate 48 will engage sufficient material to prevent the sharp edge of the hole 49 from cutting through the material of the cup-shaped member 51. As a result, the dimension "X" is less than the thickness of the mounting plate 48 and the thick part 61 of the cup-shaped member 51 to compress the thick part 61 slightly, approximately 25% of its total thickness, to give the necessary "preload" to the elastomeric material.

A mounting of the cup-shaped member 51 over the upper bearing ball retainer 27 will effectively locate the annular lip 56 on the free edge of the tapered sidewall 53 in engaging relation with the radially outer extremity of the flat portion 18 of the swivel plate 17. In this particular embodiment, the extremity of the flat portion 18 is slightly larger in diameter than the normal internal diameter of the annular lip 56 of the cup-shaped member 51. As a result, the annular lip 56 will become frictionally engaged with the extremity of the flat portion 18. This frictional engagement will be sufficient to permit a normal pivoting of the swivel plate and yoke while simultaneously preventing a rapid back-and-forth pivoting of the swivel plate and yoke about the vertical axis of the king pin 33. In addition, the frictional engagement will be sufficient to effectively seal the bearing balls 23 from outside contamination.

When shock loads are applied to the horn or yoke 12, stress is applied directly to the balls 23 and 36 and the bearing retainers 27 and 34 in the bearing construction when the bearing is fixedly attached to the mounting plate 48. However, the provision of the elastomeric cup-shaped member 51 in this particular embodiment provides a shock absorbing member between the bearing construction and the undersurface of the mounting plate 48. The spacing between the outer diameter of the shank portion 31 of the king pin 33 and the larger diameter of the hole 49 will permit the king pin 33 to rock within the hole 49. The spring washer 47 will resiliently urge the king pin to a vertical upright position and the cup-shaped member 51 will hold the yoke and bearing construction firmly in position. However, the spring washer and elastomeric cup-shaped member 51 will yield to sufficiently large forces that tend to move the king pin out of a vertical upright relation. The annular bead 58 on the cup-shaped member 51 will then be compressed whenever this sufficient force is applied to the yoke so that a lower force is actually applied to the bearings 23 and 36 and bearing retainers 27 and 34. The shock force will be absorbed by the elastomeric cup-shaped member. This construction will facilitate a longer life for the bearings 23 and 36 and bearing retainers, particularly the securement of the bearing retainers to the king pin 33 and, as a result, extend the life time of the entire bearing construction.

FIGS. 3 and 4 illustrate alternate constructions. In the embodiment of FIG. 3, a polyurethane washer 62, having a Durometer hardness identical to the Durometer hardness for the cup-shaped member 51, is positioned between the outer periphery of the spring washer 47 and the upper surface of the plate 48. The washer 62 will eliminate the metal-to-metal contact between the spring washer 47 and the mounting plate 48 to thereby reduce the wear on the spring washer 47 to, therefore, enhance its life time. In this particular embodiment, however, the spacing between the uppermost surface of the annular groove 46 and the shoulder 45 is a distance "Y", namely a distance greater than the dimension "X" in FIG. 2. However, the dimensions "Y" and "X" must be such to still provide a "preloading" of the elastomeric material of the cup-shaped member 51 and the washer 62.

The embodiment of FIG. 4 utilizes the conventional nut 63 received on the threaded end portion 66 of the shank of the king pin 33. The nut construction has been utilized for years and persons accustomed to installing this type of connection will be most familiar therewith. The diameter of the threaded end portion 66 is less than the shank portion 67 so that a shoulder 68 is defined therebetween. The spacing between the shoulder 68 and the shoulder 45 is a dimension "Z" which is slightly less than the total thickness of a washer 64, the mounting plate 48 and the thick part 61 to provide the necessary preload. During installation of the swivel mechanism 10 to the mounting plate 48, the washer 64, made of a polyurethane material having a range of Durometer hardness values identical to the range of Durometer hardness values for the cup-shaped member 51, is first placed onto the shank portion 67. Thereafter, the nut 63 is threaded onto the threaded end portion 66 until the nut 63 comes into solid engagement with the shoulder 68. The shoulder 68 will limit the spacing between the lower surface of the nut 63 and the shoulder 45 to, therefore, limit the compression of the cup-shaped member 51 and washer 64 to a predetermined desired magnitude. The operation of the embodiments illustrated in FIGS. 3 and 4 is the same as has been discussed above.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a device for use with a bearing construction for a caster mountable on a caster mounting plate including a yoke and securing means for securing said yoke to said caster mounting plate, wherein said securing means includes pin means rigidly secured to and coaxial with said bearing construction, the axes of said pin means and said bearing construction extending in a normal position perpendicular to said caster mounting plate through an opening therein, the improvement comprising first means for facilitating a tilting of said axes relative to said mounting plate, an elastomeric member mounted between said bearing construction and said caster mounting plate, said elastomeric member having a compressible characteristic sufficient to maintain said caster firmly connected to said mounting plate to maintain said axes in said normal position while simultaneously being capable of yielding to a sufficiently large force applied to said yoke to permit a relative movement between said mounting plate and said yoke to thereby prevent permanent deformation to said yoke when an abnormally high force is applied thereto and wherein said securing means includes second means for limiting the initial preload of said elastomeric member between said bearing construction and said mounting plate to maintain said axes in said normal position while simultaneously facilitating a relative tilting movement of said axes relative to said mounting plate, said elastomeric member effecting a return of said axes to said normal position.

2. The improved device according to claim 1, wherein said yoke includes a swivel plate; and
wherein said bearing construction includes bearing ball retaining means comprising first and second, annular bearing ball retainers disposed upon opposite sides of and spaced from said swivel plate and a plurality of bearing balls disposed between said ball retainers on opposite sides of said swivel plate for snug rolling engagement with said ball retainers and said swivel plate; and
wherein said elastomeric member is located between one of said bearing ball retaining means and said mounting plate.

3. The improved device according to claim 2, wherein said elastomeric member has an annular wall portion between said one of said bearing ball retaining means and said mounting plate, said annular portion including an annular bead of elastomeric material which is thicker than the remainder thereof and is located adjacent the peripheral edge thereof, said thicker part being compressed and yielding to said sufficiently large force.

4. The improved device according to claim 3, wherein said elastomeric member is cup-shaped having an outwardly tapered wall extending away from the peripheral edge of said annular wall portion to fit around said one of said annular bearing ball retainers and including a lip portion frictionally engaging said swivel plate with sufficient friction to permit a normal pivoting of said swivel plate and yoke while simultaneously preventing a rapid back-and-forth pivoting of said swivel plate and yoke and sealing the bearing balls from outside contaminants.

5. The improved device according to claim 2, wherein said bearing ball retaining means includes spacing means sleeved upon said pin means and extends between said ball retainers near their radially inner edges to limit movement of said ball retainers toward each other;

wherein said opening through said mounting plate has a diameter substantially smaller than the diameter of said pin means to define a spacing therebetween which is greater than a normal clearance spacing;

wherein said means for limiting the initial preload of said elastomeric member includes an annular groove in said pin means on a side of said mounting plate opposite said bearing ball retaining means and annular spring washer means including third means received in said annular groove and fourth means engaging said mounting plate, said spring washer means urging said pin means into tight engagement with said bearing ball retaining means to snugly clamp said elastomeric member in place while simultaneously permitting said relative tilting movement between said pin means and said mounting plate.

6. The improved device according to claim 5, wherein said elastomeric member includes a sleeve portion snugly encircling said pin means and snugly received in said spacing to resiliently maintain said pin means in a central relationship in said opening while simultaneously yielding to various forces applied to said yoke.

7. The improved device according to claim 6, including an elastomeric washer resiliently clamped between said fourth means and said mounting plate.

8. The improved device according to claim 2, wherein said bearing ball retaining means includes spacing means sleeved upon said pin means and extends between said ball retainers near their radially inner edges to limit movement of said ball retainers toward each other;

where said opening through said mounting plate has a diameter substantially smaller than the diameter of said pin means to define a spacing therebetween which is greater than a normal clearance spacing;

wherein said means for limiting the initial preload of said elastomeric member includes a shoulder on said pin means on a side of said mounting plate opposite said bearing ball retaining means spaced from said one of said bearing ball retainer means a predefined distance, a thread on said pin means on the free end thereof extending to said shoulder and a nut threaded on said thread and snugly engaging said shoulder and further including an elastomeric washer resiliently clamped between said nut and said mounting plate to facilitate the movement of said pin means relative to said mounting plate.

9. The improved device according to claim 8, wherein said elastomeric member includes a sleeve portion snugly encircling said pin means and snugly received in said spacing to resiliently maintain said pin means in a central relationship in said opening while simultaneously yielding to various forces applied to said yoke.

10. The improved device according to claim 9, including an elastomeric washer resiliently clamped between said nut and said mounting plate.

* * * * *